United States Patent [19]

Boatwright et al.

[11] Patent Number: 4,716,018
[45] Date of Patent: Dec. 29, 1987

[54] END PLUG WITH TRUNCATED TAPERED LEADING END CONFIGURATION

[75] Inventors: David A. Boatwright, Columbia; Wade H. Widener, Cayce, both of S.C.

[73] Assignee: Westinghouse Electric Corp., Pittsburgh, Pa.

[21] Appl. No.: 797,331

[22] Filed: Nov. 12, 1985

[51] Int. Cl.$^4$ .............................................. G21C 3/10
[52] U.S. Cl. .................................. 376/451; 376/440; 294/906
[58] Field of Search ............... 376/451, 452, 456, 440, 376/260, 261; 166/192; 294/906, 86.24; 403/289, 361

[56] References Cited

U.S. PATENT DOCUMENTS

| | | |
|---|---|---|
| 2,852,456 | 9/1958 | Wade . |
| 3,009,869 | 11/1961 | Bassett . |
| 3,413,196 | 11/1968 | Fortescue et al. . |
| 3,683,148 | 8/1972 | Boyko et al. . |
| 3,743,578 | 7/1973 | Agranier et al. ............... 376/451 X |
| 3,836,431 | 9/1974 | Flipot et al. . |
| 4,236,966 | 12/1980 | Savin et al. ..................... 294/906 X |
| 4,576,787 | 3/1986 | Alsop et al. ..................... 376/451 X |

Primary Examiner—John F. Terapane
Assistant Examiner—John S. Maples

[57] ABSTRACT

An improved end plug for attachment on an end of a cladding tube of a nuclear fuel rod facilitates using a gripper tool for loading the fuel rod into a nuclear fuel assembly. The end plug includes an inner portion adapted to be inserted into the end of the tube and an outer portion adapted to extend from the end of the tube when the inner portion is inserted therein. The outer plug portion has a body part disposed adjacent the tube end and a leading part disposed remote from the tube end. The leading part of the outer plug portion has a hollow interior cavity defined therein, an exterior annular truncated surface defined on a terminal end thereof and an exterior annular tapered surface defined on a lateral side thereof. The exterior tapered surface extends between and merges with the body part and the exterior truncated surface and provides sufficient angular inclination so as to facilitate insertion of the end plug when mounted on the fuel rod tube end into the fuel assembly. The interior cavity in the leading part has an inner end, an outer opening defined at and surrounded by the exterior annular truncated surface and an interior annular wall surface interconnecting the inner end and the outer opening. An undercut annular groove is defined in the interior wall surface of the cavity, has a larger diametrical size than the interior wall surface and is spaced from the cavity opening. The groove is engageable by the gripper tool when fitted through the cavity opening for loading the fuel rod into the nuclear fuel assembly. The leading part has a thickness between the exterior tapered surface thereon and the interior cavity undercut groove therein which is less than the radius of the groove and greater than the width of the exterior truncated surface, and the interior wall surface of the cavity has an axial length between the exterior truncated surface and the undercut groove which is greater than the axial width of the groove, such that the leading part is provided with sufficient wall structure laterally surrounding the interior cavity to react the forces created by engagement of the gripper tool within the cavity groove.

4 Claims, 5 Drawing Figures

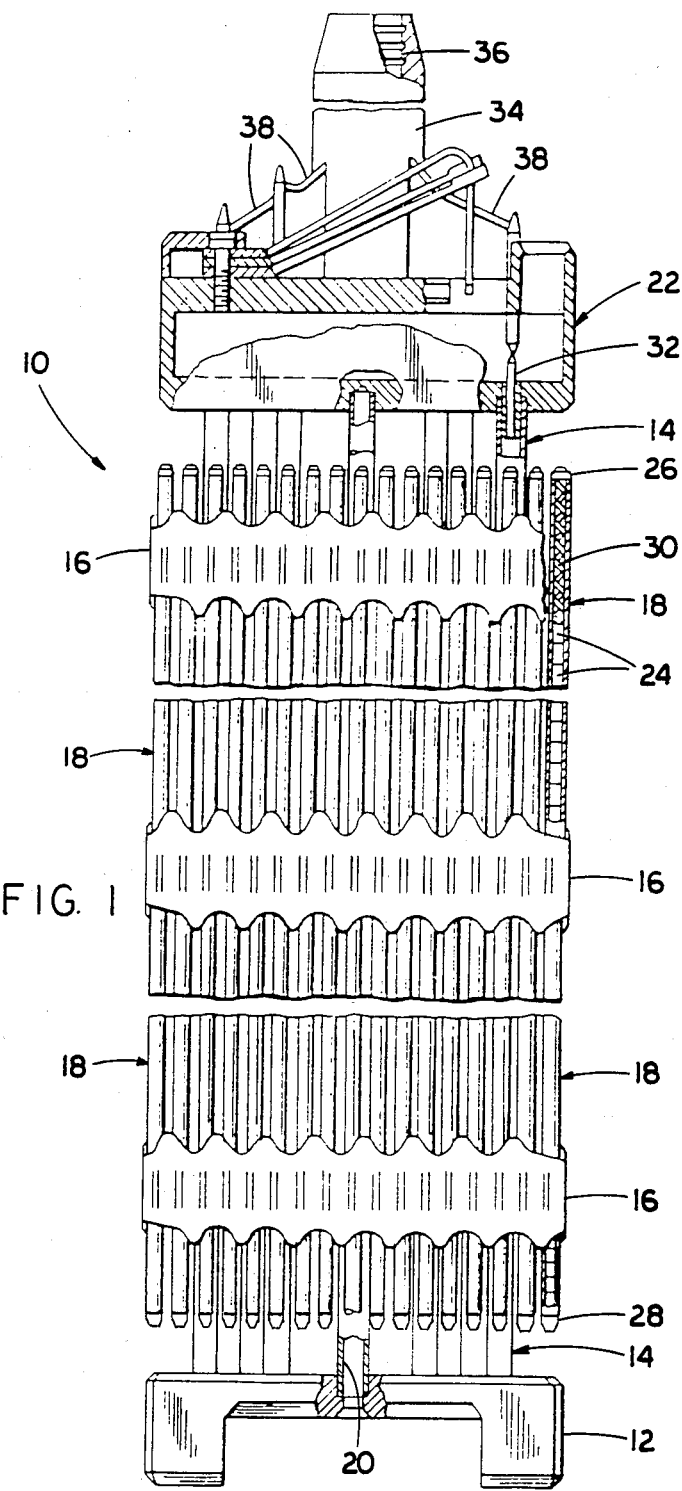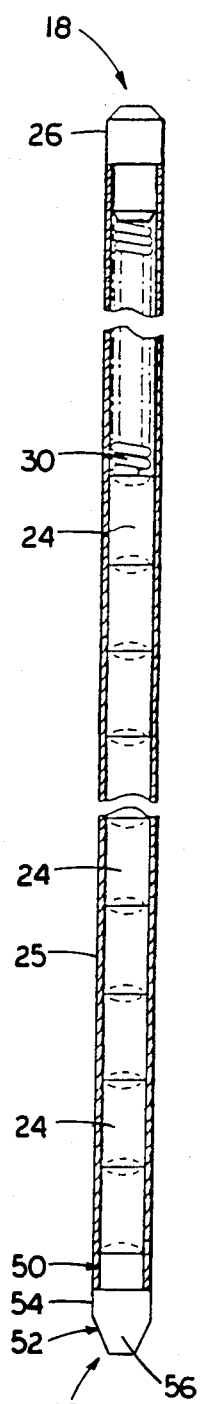
FIG. 1
FIG. 2

END PLUG WITH TRUNCATED TAPERED LEADING END CONFIGURATION

BACKGROUND OF THE INVENTION

1. Field of the Invention

The present invention relates generally to fuel assemblies for nuclear reactors and, more particularly, is concerned with an improved fuel rod end plug configuration which facilitates both pulling fuel rods into the top of a fuel assembly from the bottom thereof during initial loading at the manufacturing site and pushing fuel rods into the top of the fuel assembly from the top thereof during subsequent servicing at the reactor facility.

2. Description of the Prior Art

In a typical nuclear reactor, the reactor core includes a large number of elongated fuel assemblies. Conventional designs of these fuel assemblies include top and bottom nozzles with a plurality of elongated transversely spaced guide thimbles extending longitudinally between and connected at opposite ends to the nozzles and a plurality of transverse support grids axially spaced along the guide thimbles. Also, each fuel assembly is composed of a multiplicity of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

In assembling a fuel assembly, it has been conventional practice, first, to attach the transverse grids to the longitudinally extending guide thimbles at predetermined axially spaced locations therealong. Next, the fuel rods are loaded through the grids and the bottom nozzle is then attached to the lower ends of the guide thimbles. Last, the top nozzle is attached to the upper ends of the guide thimbles.

Typically, the fuel rods are loaded by pulling them through the grids from the bottom of the fuel assembly. The fuel assembly under construction is located between a fuel rod loader and a fuel rod magazine. At the bottom of the fuel assembly, a gripper is extended outwardly from the fuel rod loader, through the fuel assembly, and to the fuel rod magazine located at the top of the assembly. The gripper is brought into engagement with the lower end plug of a fuel rod stored in the magazine and is then retracted back through the fuel assembly, pulling the fuel rod from the magazine into and through the grids of the assembly.

Loading fuel rods into the top of the fuel assembly by pulling from the bottom of the assembly works satisfactorily in the manufacturing plant; however, once the fuel assembly is in service in a reactor facility, replacement loading of a fuel rod by pulling from the bottom of the assembly becomes more difficult. This is because servicing of a fuel assembly normally takes place while the assembly is submerged in water at a work station and also due to the unavailability of loading equipment at reactor facilities which pulls fuel rods from the bottom of the fuel assembly. Therefore, when a fuel rod needs to be replaced in the reactor facility, it will usually be loaded into the assembly from the top by pushing the rod, instead of pulling it, into the fuel assembly.

However, a problem frequently arises when a fuel rod is being pushed into the fuel assembly. The lower end plug of the fuel rod, which has a relatively blunt leading surface, often gets hung up on the flow mixing vanes carried by the support grids of the fuel assembly into which the fuel rod must pass. Several competing interests make a solution to this problem difficult. On the one hand, the blunt configuration of the leading end plug surface accommodates the presence of a large open interior cavity having sufficient lateral wall structure for the gripper to enter and grab the end plug for bottom loading of the fuel rod. On the other hand, a fully tapered or "pencil point" end plug configuration would help prevent the fuel rod end plug from becoming hung up on the grid mixing vanes during top loading of the fuel rod. However, if the end plug was fully tapered, there would be insufficient lateral wall structure to define an interior cavity for the gripper to engage for effecting bottom loading of the fuel rod. Consequently, a need exists for a fuel rod end plug design which will strike a workable compromise between these competing interests and thereby facilitate loading of the fuel rod from both the bottom and top of the fuel assembly by accommodating both pulling and pushing of the fuel rod into the fuel assembly.

SUMMARY OF THE INVENTION

The present invention provides a fuel rod end plug with an improved truncated tapered leading end configuration designed to satisfy the aforementioned needs. The improved end plug configuration provides sufficient lateral wall structure on the leading end of the plug to allow the formation of an interior cavity large enough to be engaged by the gripper. Therefore, the present fuel rod loading equipment and methods can continue to be used. Further, the truncated tapered configuration on the end plug leading end provides sufficient angular inclination to prevent the fuel rod from hanging up on the mixing vanes of the fuel assembly grids. Thus, replacement top loading of fuel rods at the reactor facility is facilitated by the improved end plug configuration.

Accordingly, the present invention is directed to an improved end plug for attachment on an end of a cladding tube of a nuclear fuel rod which facilitates using a gripper tool for loading the fuel rod into a nuclear fuel assembly. The improved end plug comprises: (a) an inner portion adapted to be inserted into the end of the tube; and (b) an outer portion adapted to extend from the end of the tube when the inner portion is inserted therein, the outer portion including a body part disposed adjacent the tube end and a leading part disposed remote from the tube end. The leading part of the outer end plug portion has a hollow interior cavity defined therein, an exterior annular truncated surface defined on a terminal end thereof and an exterior annular tapered surface defined on a lateral side of the leading part. The exterior tapered surface extends between and merges with the body part and the exterior truncated surface and provides sufficient angular inclination so as to facilitate insertion of the end plug when mounted on the fuel rod tube end into the fuel assembly.

More particularly, the interior cavity in the leading part has an inner end, an outer opening defined at and surrounded by the exterior annular truncated surface and an interior annular wall surface interconnecting the inner end and the outer opening. Also, the interior wall surface of the cavity has an undercut annular groove defined therein having a larger diametrical size than the interior wall surface and being spaced from the cavity opening. The groove is engageable by the gripper tool when fitted through the cavity opening for loading the fuel rod into the nuclear fuel assembly.

Still further, the inner end of the cavity is located within the leading part at an axial distance from the outer opening which is substantially the same as the axial distance through which the exterior tapered surface of the leading part extends from the truncated surface to the body part such that the cavity at its inner end extends outwardly away from the body part of the outer end plug portion. Also, the body part has an exterior annular cylindrical surface which merges with the exterior tapered surface of the leading part and is of a diametrical size substantially equal to that of the fuel rod tube. Additionally, the leading part has a thickness between the exterior tapered surface thereon and the interior cavity undercut groove therein which is less than the radius of the groove and greater than the width of the exterior truncated surface, and the interior wall surface of the cavity has an axial length between the exterior truncated surface and the undercut groove which is greater than the axial width of the groove, such that the leading part of the outer end plug portion is provided with sufficient wall structure laterally surrounding the interior cavity to react the forces created by engagement of the gripper tool within the cavity groove.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is an elevational view, partly in section, of a fuel assembly which incorporates fuel rods employing lower end plugs having the improved truncated tapered leading end configuration of the present invention, the fuel assembly being illustrated in vertically foreshortened form with parts broken away for clarity.

FIG. 2 is an enlarged longitudinal view of one of the fuel rods removed from the fuel assembly of FIG. 1, showing the fuel rod in vertically foreshortened and partly sectioned form.

DETAILED DESCRIPTION OF THE INVENTION

Figure 3:
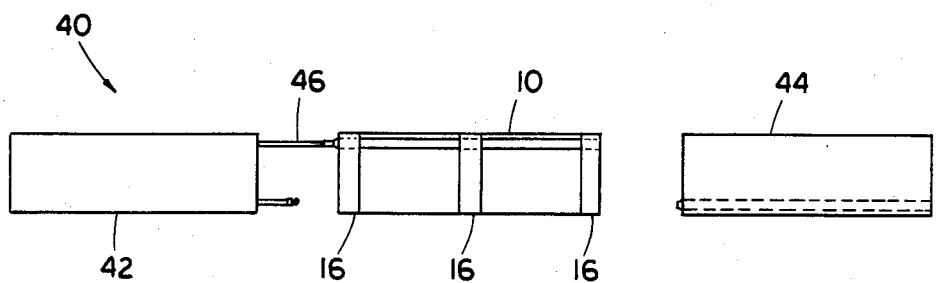
FIG. 3 is a schematic representation of a fuel rod loader and a fuel rod magazine disposed respectively adjacent bottom and top ends of a fuel assembly for effecting loading of fuel rods into the fuel assembly by pulling them from the magazine into the top of the fuel assembly and toward the bottom thereof by the gripper.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. As seen in FIG. 1 and in greater detail in FIG. 2, each fuel rod 18 includes a plurality of nuclear fuel pellets 24 disposed in a stack in an elongated hollow cladding tube 25 having its opposite ends closed by upper and lower end plugs 26,28 so as to hermetically seal the rod. The lower end plug 28 has the improved configuration of the present invention to be described later. Commonly, a plenum spring 30 is disposed within the cladding tube 25 between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fisson process in the fuel assembly 10, all in a well-known manner.

Improved End Plug Configuration

Figure 4:
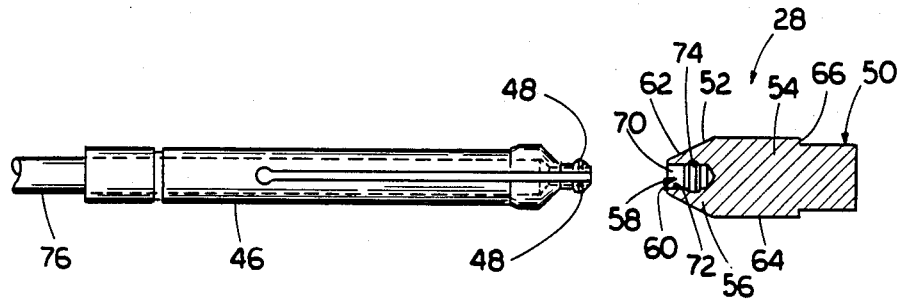
FIG. 4 is an enlarged view of a gripper of the fuel rod loader of FIG. 3 being aligned for insertion into the truncated tapered leading end of the improved end plug on the lower end of a fuel rod, such as seen in FIG. 2.

Turning now to FIG. 3, there is seen the fuel rod storage and loading equipment, generally designated 40, which is currently used for loading fuel rods 18 into the fuel assembly 10 by pulling them from the bottom of the assembly through the top thereof. The equipment 40 includes a fuel rod loader 42 and a fuel rod magazine 44. The loader 42 has an extendible and retractible gripper 46. When the fuel assembly 10 under construction is located between the loader 42 and magazine 44, with the loader at the bottom of the assembly and the magazine at the top thereof, the gripper 46 is extended outwardly from the loader, through the fuel assembly grids 16, and to the fuel rod magazine. There, an arrangement of radially expandable and collapsible end projections 48 on the end of the gripper 46, as seen in FIG. 4, is brought into engagement with the lower end plug 28 of one of the fuel rods 18 stored in the magazine 44 and is then retracted back through the fuel assembly 10, pulling the fuel rod 18 from the magazine into and through the grids of the assembly.

Figure 5:
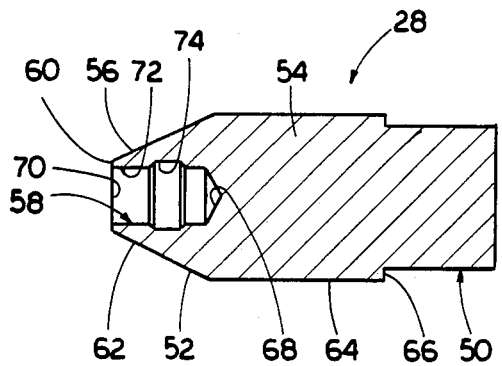
FIG. 5 is a sectional view, on a larger scale, of the improved end plug configuration of FIG. 4.

Referring to FIG. 5, there is illustrated the improved truncated tapered configuration of the end plug 28 adapted for mounting on the lower end of the fuel rod tube 25. The end plug 28 facilitates insertion of the fuel rod 18 into the fuel assembly 10 by pulling it through from the bottom or pushing it through from the top thereof without hanging up on mixing vanes (not shown) on the fuel assembly grids 16. Basically, the improved end plug 28 includes an inner portion 50 adapted to be inserted into the end of the fuel rod tube 25, and an outer portion 52 adapted to extend from the end of the tube. The outer end plug portion 52, in turn, includes a body part 54 disposed adjacent the tube end and a leading part 56 disposed remote from the tube end.

The improved truncated tapered configuration of the end plug 28 is defined on its leading part 56. The leading part 56 has a hollow interior cavity 58 defined therein, an exterior annular truncated surface 60 defined on a terminal end thereof and a continuous exterior annular tapered surface 62 defined about a lateral side thereof. The exterior tapered side surface 62 extends between and merges with the body part 54 and the exterior truncated end surface 60. The tapered side surface also provides sufficient angular inclination so as to facilitate insertion of the end plug 28 on the fuel rod tube 25 into the fuel assembly 10 without hanging up on the mixing vanes (not shown) on the grids 16 of the assembly.

The body part 54 of the outer plug portion 52 has a continuous exterior annular cylindrical side surface 65 which merges with the exterior tapered side surface 62 of the leading part 56 and is of a diametrical size substantially equal to that of the fuel rod tube 25. The end plug 28 is adapted to be attached to the tube end by a weld (not shown) which would be formed about the inwardly-facing shoulder 66 defined at the transition between the inner and outer portions 50,52 of the end plug 28. The cylindrical side surface 64 has an axial length sufficient to provide a cylindrical region on the plug 28 about which the plug can be rigidly held during its fabrication, such as during machining of the interior cavity 58 and the tapered surface 62.

The interior cavity 58 in the leading end plug part 56 has an inner end 68, an outer opening 70 defined at and surrounded by the exterior annular truncated surface 60 and a continuous interior annular wall surface 72 interconnecting the inner end 68 and the outer opening 70. The interior wall surface 72 of the cavity 58 has the same constant diameter from its inner end 68 to its outer opening 70. The inner wall surface 72 further has a continuous undercut annular groove 74 defined therein which has a larger diametrical size than that of inner and outer annular portions of the interior wall surface 72 on opposite sides of the groove. Also, the groove 74 is spaced axially inwardly from the cavity opening 70. The undercut groove 74 is engageable by the radial projections 48 on the gripper 46 when fitted through the cavity opening 70 for loading the fuel rod 18 into the nuclear fuel assembly 10. Specifically, when the projections 48 are in their collapsed, inwardly-biased position, as seen in FIG. 4, they can be inserted through the cavity opening 70 and into alignment with the groove 74 therein. Then, upon movement of a central pin 76, the projections 48 are forced outward into the groove 74 so as to grip the end plug 28 about the interior cavity 58. Furthermore, the inner end 68 of the interior cavity 58 is located at an axial distance from the cavity opening 70 which is substantially the same as the axial distance through which the exterior tapered surface 62 of the leading part extends from the truncated surface 60 to the body part 54. Accordingly, the cavity 58 at its inner end 68 extends outwardly away from the body part 54 of the outer plug portion 52.

To provide sufficient wall structure laterally surrounding the interior cavity 58 against which to react the forces created by engagement of the gripper projections 48 within the cavity groove 74, two relationships of the features contained in the leading part 56 are important. First, the leading part 56 must have a thickness through its region which extends between its exterior tapered side surface 62 and its interior cavity undercut groove 74 which is less than the radius of the groove and greater than the width of the exterior truncated surface 60. Second, the interior wall surface 72 of the cavity 58 must have an axial length between the exterior truncated end surface 60 and the undercut groove 74 which is greater than the axial width of the groove.

In an exemplary embodiment of the end plug 28, the dimensions (in inch) of its above-described features are as follows:

Axial length of end plug 28: 511+/−0.010
Axial length of inner portion 50: 0.130+/−0.005
Axial length of outer portion 52: 0.381+/−0.010
Diameter of inner portion 50: 0.317+/−0−1
Diameter of body part 54: 0.361+/−0.003
Axial length of body part 54: 0.150+/−0.010
Diameter of truncated end surface 60: 0.125+/−0.003
Diameter of cavity opening 70: 0.113+/−0.003
Diameter of cavity groove 74: 0.142+/−0.003
Width of cavity groove 74: 0.027+/−0.002
Angle of tapered surface 62 from axis A: 27 deg. +/−1 deg.

The extent of the inclination of the tapered surface 62 on the leading part 56 is limited to the point at which an operable interior diameter of the cavity 58 can be maintained. Through experimentation, it has been determined that the minimum operable diameter for the cavity 58 which is maintainable in production is 0.113 inch. The maximum diameter for the truncated surface 60, or the most "blunt" the leading part can be, while still permitting satisfactory mixing vane avoidance is 0.150 inch. With such dimensions for the cavity opening 70 and truncated surface 60, sufficient lateral wall structure is incorporated by the leading part 56 to absorb the reaction forces of the gripper 46 on the end plug 28 without fracture of its leading part 56.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An improved end plug for attachment on an end of a cladding tube of a nuclear fuel rod which facilitates using a gripper tool for loading the fuel rod into a nuclear fuel assembly, comprising:
   (a) an inner portion adapted to be inserted into said end of said tube; and
   (b) an outer portion adapted to extend from said end of said tube when said inner portion is inserted therein, said outer portion including a body part disposed adjacent said tube end and a leading part disposed remote from said tube end;
   (c) said leading part having a hollow interior cavity defined therein, a continuous exterior annular truncated surface defined on a terminal end of said leading part and a continuous exterior annular tapered surface defined on a lateral side of said leading part;
   (d) said exterior tapered surface extending between and merging with said body part and said exterior truncated surface and providing sufficient angular inclination so as to facilitate insertion of the end plug when mounted on the fuel rod tube end into the fuel assembly;
   (e) said interior cavity in said leading part having an inner end, an outer opening defined at and surrounded by said exterior annular truncated surface and a continuous interior annular wall surface interconnecting said inner end and said outer opening, said interior wall surface being of the same constant diameter from said inner end to said outer opening;
   (f) said interior wall surface of said cavity having a continuous undercut annular groove defined therein having a larger diametrical size than that of inner and outer annular portions of said interior wall surface on opposite sides of said groove, said groove being axially spaced from said cavity opening and engageable by the gripper tool fitted through said cavity opening for loading the fuel rod into the nuclear fuel assembly;
   (g) said leading part having a thickness between said exterior tapered surface thereon and said interior cavity undercut groove therein which is less than the radius of said groove and greater than the width of said exterior truncated surface, said interior wall surface of said cavity within said leading part having an axial length between said exterior truncated surface and said undercut groove which is greater than than the axial width of said groove such that said leading part is provided with sufficient wall structure laterally surrounding said interior cavity to react the forces created by engagement of the gripper tool within the cavity groove.

2. The end plug as recited in claim 1, wherein said inner end of said cavity is located within said leading part at an axial distance from said outer opening substantially the same as the axial distance through which said exterior tapered surface of said leading part extends from said truncated surface to said body part such that said cavity at its inner end extends outwardly away from said body part of said upper end plug portion.

3. The end plug as recited in claim 1, wherein said body part has an exterior annular cylindrical surface which merges with said exterior tapered surface of said leading part and is of a diametrical size substantially equal to that of the fuel rod tube.

4. An improved end plug for attachment on an end of a cladding tube of a nuclear fuel rod which facilitates using a gripper tool for loading the fuel rod into a nuclear fuel assembly, comprising:
   (a) an inner portion adapted to be inserted into said end of said tube; and
   (b) an outer portion adapted to extend from said end of said tube when said inner portion is inserted therein, said outer portion including a body part disposed adjacent said tube end and a leading part disposed remote from said tube end;
   (c) said leading part having a hollow interior cavity defined therein, a continuous exterior annular truncated surface defined on a terminal end of said leading part and a continuous exterior annular tapered surface defined on a lateral side of said leading part;
   (d) said exterior tapered surface extending between and merging with said body part and said exterior truncated surface and providing sufficient angular inclination so as to facilitate insertion of the end plug when mounted on the fuel rod tube end into the fuel assembly;
   (e) said interior cavity in said leading part having an inner end, an outer opening defined at and surrounded by said exterior annular truncated surface and a continuous interior annular wall surface interconnecting said inner end and said outer opening, said interior wall surface being of the same constant diameter from said inner end to said outer opening;
   (f) said interior wall surface of said cavity having a continuous undercut annular groove defined therein having a larger diametrical size than that of inner and outer annular portions of said interior wall surface on opposite sides of said groove, said groove being axially spaced from said cavity opening and engageable by the gripper tool fitted through said cavity opening for loading the fuel rod into the nuclear fuel assembly;
   (g) said inner end of said cavity being located within said leading part at an axial distance from said outer opening substantially the same as the axial distance through which said exterior tapered surface of said leading part extends from said truncated surface to said body part such that said cavity at its inner end extends outwardly away from said body part of said outer end plug portion;
   (h) said body part having an exterior annular cylindrical surface which merges with said exterior tapered surface of said leading part and is of a diametrical size substantially equl to that of the fuel rod tube;
   (i) said leading part having a thickness between said exterior tapered surface thereon and said interior cavity undercut groove therein which is less than the radius of said groove and greater than the width of said exterior truncated surface, said interior wall surface of said cavity within said leading part having an axial length between said exterior truncated surface and said undercut groove which is greater than the axial width of said groove such that said leading part is provided with sufficient wall structure laterally surrounding said interior cavity to react the forces created by engagement of the gripper tool within the cavity groove.

* * * * *